(12) United States Patent
Goda et al.

(10) Patent No.: US 8,115,780 B2
(45) Date of Patent: Feb. 14, 2012

(54) IMAGE GENERATOR

(75) Inventors: Simon Goda, Bristol (GB); Stephen Hill, Somerset (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 889 days.

(21) Appl. No.: 11/655,051

(22) Filed: Jan. 18, 2007

(65) Prior Publication Data

US 2007/0257936 A1 Nov. 8, 2007

(30) Foreign Application Priority Data

Jan. 19, 2006 (EP) ..................................... 06250286

(51) Int. Cl.
*G09G 5/00* (2006.01)

(52) U.S. Cl. ........ 345/611; 345/530; 345/564; 345/613; 382/269

(58) Field of Classification Search ........................ None
See application file for complete search history.

(56) References Cited

U.S. PATENT DOCUMENTS 6,999,100 B1 * 2/2006 Leather et al. ................ 345/611
7,301,542 B1 * 11/2007 Toksvig et al. ............... 345/530
7,495,672 B2 * 2/2009 Akenine-Moller et al. .. 345/611

OTHER PUBLICATIONS

Jon Hasselgren et al., "A Family of Inexpensive Sampling Schemes," Computer Graphics Forum, vol. 24, No. 4, Dec. 2004, pp. 843-848.
Tomas Akenine-Moller et al., "An Extremely Inexpensive Multisampling Scheme," Aug. 15, 2003, http://www.cs.lth.se/home/Tomas_Akenine_Moller/pubs/fliptri_tr.pdf, pp. 1-6.
"HRAA: High-Resolution Antialiasing Through Multisampling," 2002, http://www.nvidia.com/attach/151, pp. 1-9.

* cited by examiner

*Primary Examiner* — Kee M Tung
*Assistant Examiner* — Jwalant Amin

(57) ABSTRACT

A system and method for generating an image on a display. The display includes a plurality of pixels from a vector description of a scene. The data is sampled from the vector description to provide data samples at locations defined in relation to the pixels. For example, the locations may include a first and second locations at the edges of the pixels, a third location at the corner of the pixels and a fourth location at the center of the pixels. The data samples are stored in a buffer and processed for each of the pixels to give an averaged data value. The image is then generated the image on the display by applying the averaged data value to each of the pixels. The calculation of the weighted averaged color value is repeated for each of the fragments in the buffer until all of the samples have been averaged.

25 Claims, 5 Drawing Sheets

IMAGE GENERATOR

CROSS-REFERENCE TO RELATED APPLICATIONS

The present application is related to European Patent Application No. 06250286.9, filed Jan. 19, 2006, entitled "A METHOD OF GENERATING AN IMAGE". European Patent Application No. 06250286.9 is assigned to the assignee of the present application and is hereby incorporated by reference into the present disclosure as if fully set forth herein. The present application hereby claims priority under 35 U.S.C. §119(a) to European Patent Application No. 06250286.9.

TECHNICAL FIELD

The present disclosure is related to methods of generating an image and in particular, but not exclusively, with anti-aliasing an image in a graphics scene generated by a computer.

BACKGROUND

The field of computer graphics is a fast changing one, in which trade-offs are made between the quality of the images being produced and the processing power of the computing platform being used. The trade-off becomes even more acute when the images need to be displayed in real-time, for example in the video-gaming industry.

Rendering is the process of generating an image from a model of a scene, where the model is a description of three dimensional objects. The rendering of an image on a computer screen entails vast amounts of processing. For example, it is necessary to have a so-called "global scene" (also known as the "world scene") of the images to be displayed, and which will be hereinafter referred to as the scene. Broadly speaking, a scene can be thought of as a snap-shot or picture of the image to be displayed on the screen at any instant in time. As would be expected, a scene will itself comprise many different objects each having their own geometry. For example, a global scene might be the interior of a particular room in a house. The room might have windows, furniture, a TV, etc. Each object, for example TV, table, window will have a different geometry and will need to be created with the correct dimensions and co-ordinates on the screen in relation to the other images.

These objects are defined in three dimensions (3D), but will be rendered onto a two-dimensional (2D) computer screen. The technique for rendering a 3D object onto a 2D display involves firstly breaking down the 3D object into polygons defined by primitives. A popular primitive used is a triangle having three vertices. Other primitives can also be used, including points, lines or other polygons. Thus, a 3D image can be transformed into a plurality of, for example, triangles each being defined by a unique set of vertices where each vertex would typically contain information relating to co-ordinates (x, y, z), color, texture and lighting. The data defining the 3D image is continuous vector data. It should be understood that a fairly large storage area is needed to accommodate the vertex information.

The creation of an image on a display is performed by a "graphics pipeline", which takes a geometrical representation of a 3D scene as an input and outputs a 2D image for display on a computer screen. Broadly speaking, the creation of an image on a computer graphics screen can be thought of as consisting of a geometry stage and a rendering stage. In existing systems, the geometry stage is responsible for transformation and lighting, in which the 3D object is converted into a number of polygons defined by a set of suitable primitives. Consider an interactive computer game where the user controls the motion of his player, as the player moves forward or backward the objects in the frame will need to be transformed so that they appear closer to and further away from the user, respectively.

In the rendering stage the transformed vertices are placed in a frame buffer in digital form. The frame buffer can in fact comprise a number of buffers, e.g. a color buffer, depth buffer, stencil buffer, accumulation buffer. The frame buffer needs to be continuously managed and updated as the frame (or scene) changes. The rendering stage comprises the process of Rasterization. Rasterization describes the conversion from a vector representation to an x-y coordinate representation. This is the process of taking a two-dimensional image described in a vector format and converting it into pixels, where the pixels are the "dots" that make up the computer display (and correspond to the smallest discrete part of an image that can be displayed). The pixels are drawn and the frame buffer stores lighting, color and intensity information for each pixel that will be enabled. The digital frame data is then converted to an analogue signal to be used to provide the final image for the actual 2D computer display.

The problem of "aliasing" in two and three dimensional computer graphics is well known. When an image is rendered, aliasing is a result of the rendering process being a sampling procedure. Continuous vector data, such as the vertex positions of the primitives making up a scene in a three dimensional space, are effectively discretised as they are turned into screen pixels by the rendering process. Smooth polygon edges are drawn onto the display with what are known as "jaggies" because of insufficient pixel resolution. If the 3D images are animated, then the moving edges have "crawlies" as they jump from one pixel to the next, with instantaneous changes of color.

An example of this problem is shown in FIG. 1, in which is illustrated a grid 100 of 8×8 pixels, representing a portion of a display. The display is rendering a representation of a black shape delimited by continuous line 102. In the example shown in FIG. 1, the color of a pixel is determined by taking a sample of the color at the center point of each pixel. As a result of the sampling, pixels that are fully within the black shape delimited by line 102 are colored black, such as the pixel labelled 104. Similarly, pixels outside the area of the black shape are colored white, such as the pixel labelled 106. The pixels at the border of the black shape (i.e. the pixels through which line 102 crosses) are either black or white, depending on the color at the center point of the pixel. For example, the center of the pixel labelled 108 is inside the line 102, and this pixel is therefore colored black. Conversely, the center of the pixel 110 is just outside the line 102, and this pixel is therefore colored white. The result of this is that the representation of the shape on the grid of pixels 100 has a jagged edge (hence "jaggies").

A way of minimising this problem is to use anti-aliasing techniques. Anti-aliasing techniques are processes applied as a part of the rendering stage which aim to improve the visual quality of the final displayed image. Anti-aliasing techniques can be divided into two distinct classes: edge anti-aliasing (also called per-primitive anti-aliasing) and full screen anti-aliasing.

Edge (or per-primitive) techniques use computations to blend the geometric edges of primitives (i.e. points, lines, triangles, polygons) in order to reduce aliasing effects. Although this method generally requires less computation than other methods, it can also produce lower quality results because it effectively ignores edges introduced by textures or by primitive intersections.

Full-screen anti-aliasing works on every fragment, regardless of its location with respect to the primitive (note: a fragment consists of the (X, Y) coordinates of a pixel on the final display surface, plus a collection of other necessary information such as color, relative depth (the Z coordinate), texture coordinates etc.). This can result in some wasted calculations in areas of continuous color but generally provides better overall results. The present application is primarily concerned with full-screen anti-aliasing.

In general, full-screen anti-aliasing works by generating more information than is necessary for the final displayed image (in a non anti-aliased system) and then re-sampling this data. This is done by taking several samples of data from the continuous vector image per fragment (i.e. per pixel in the display) which are then combined to give the final result. The samples taken of a fragment may also be called sub-fragments. This formula for combining the samples can be expressed as follows:

$$p(x, y) = \sum_{i=1}^{n} w_i c(i, x, y) \quad \text{(Equation 1)}$$

Where p is the final pixel color, n is the number of samples per pixel, $w_i$ is a weighting factor (in the range [0, 1]) and c is the sample color for sample i.

The precise location within the region defined by the pixel from where these n samples or sub-fragments are taken is determined by the sample pattern being used. Different sample patterns allow a trade off between computation and performance. By using more samples per fragment there is an increase in visual quality but this leads to a much higher computational requirement as each sample has to be processed by the rendering stage. Example known sample patterns are described hereinafter.

An illustrative example of full-screen anti-aliasing can be seen with reference to FIG. 2. This shows the same grid of pixels 100 as shown in FIG. 1, which is rendering the same representation of a black shape delimited by continuous line 102. However, the color of the pixels through which the line 102 passes are not only either black or white, as was seen in FIG. 1. Rather, due to the anti-aliasing, these are levels of grey dependent on the samples taken within the pixel and applied to Equation 1. As a result, the image does not have the jagged edges of FIG. 1, and the image as a whole is perceived as being of a higher quality. The pixel sizes of FIGS. 1 and 2 are, of course, greatly exaggerated compared to a real display. Furthermore, note that FIGS. 1 and 2 are shown as black and white images merely for illustrative purposes, and that the anti-aliasing techniques also apply for color images.

Another distinction that can be made between anti-aliasing techniques is between super-sampling and multisampling. In super-sampling, all fragment data is generated for all samples. This means all fragment data is re-sampled and contributes to the final pixel. In multisampling, sets of samples or sub-fragments may share particular parts of the fragment information. For example, a set of samples may all have the same texture coordinates but different color values. In fact, a multisampling scheme can share everything apart from color, although a penalty is paid in terms of some degradation in quality.

A set of six example sample patterns are shown illustrated in FIG. 3. The first sample pattern in FIG. 3 is point sampling 302. Point sampling corresponds to the non anti-aliased case with one sample per display pixel, whereby the sample is taken from the center of the pixel. This is the type of pattern used to generate the non anti-aliased image shown previously in FIG. 1.

The second and third sample patterns are denoted 1×2 sample (304) and 2×1 sample (306). These sample patterns both use two samples per pixel, wherein the 1×2 sample pattern has the two samples aligned vertically and the 2×1 sample pattern has the two samples aligned horizontally. Both of these two-sample patterns give lower quality results in edges which are either tending towards the horizontal or the vertical (depending on which one is being used).

The fourth sample pattern shown in FIG. 3 is denoted 2×2 sample (308). The 2×2 sample pattern utilises four samples per pixel in a regular square. This pattern is generally accepted to give good results, although may not provide particularly good resolution in the X and Y directions. The fifth sample pattern, called the Rotated Grid Super Sample pattern (310) is an attempt to improve on this problem with the 2×2 sample pattern. This pattern again uses four samples per pixel, but the samples are rotated with respect to the center of each pixel when compared to the 2×2 sample pattern.

The sixth sample pattern is a 4×4 checker pattern (312). This pattern uses eight samples per pixel. This type of pattern is typically only used where performance issues are far outweighed by the need for quality (such as for computer aided design (CAD) or design applications).

All of the sample patterns shown in FIG. 3 use a constant down-sampling weight for each sample (i.e. $w_i$=1/n in Equation 1, above). For example, for the 2×2 sample pattern (308) a weighting value of 0.25 is used. This effectively means a box filter is being used for the down-sampling.

The main disadvantage of all the patterns in FIG. 3 is that, in order to achieve a reasonable level of quality in the results, several samples per pixel are required. All of these samples need to be processed through the graphics pipeline from the rasterizer down. Having to process, for example, four samples per pixel results in a four-fold increase in memory bandwidth requirements, power, etc. Equally, this results in a reduction in performance by a similar factor.

In order to address the problem of having to process large numbers of samples per pixel, sample patterns have been proposed that share samples between neighbouring pixels. This means that fewer samples must be processed by the fragment pipeline but a reasonable number of samples still contribute to each final display pixel.

An example of two shared sample patterns are shown in FIG. 4. Both of these patterns use, on average, two samples per pixel. The "Quincunx" pattern 402 uses a slightly different paradigm to all of the other patterns discussed here in its use of weightings in the down-sampling. Instead of a constant value for each sample, the center value is given a weighting of ½, and each of the four corner samples ⅛. In sampling theory parlance this is a "tent filter", which is an attempt to use a more accurate model of the ideal low-pass filter: the sinc filter.

The "Flipquad" pattern 404 uses a constant weighting, as with the patterns shown in FIG. 3. Effectively it is the RGSS pattern 310 except with the samples pushed out to the pixel edges to allow sharing of samples. The pattern alternates between adjacent pixels, which is intended to give better results for horizontal, vertical and 45° edges. It is reputed that the human visual system is more sensitive to quality issues on these kinds of edges.

Both of the patterns in FIG. 4 aim to provide quality on a par with those produced using 2×2 or RGSS patterns (308, 310), whilst requiring a lower number of samples per pixel, and hence less computation.

SUMMARY

The present disclosure generally provides an image generator.

In one embodiment, the present disclosure provides a method of generating an image on a display having a plurality of pixels from a vector description of a scene. The method includes sampling data from the vector description to provide the data samples at locations defined in relation to the pixels from the vector description. The locations include a first and a second location at the edges of the pixels, a third location at the corner of the pixels and a fourth location at the center of the pixels. The method further includes storing the data samples in a buffer and processing the data samples taken for each of the pixels to give an averaged data value for each of the pixels. The method still further includes generating the image on the display by applying the averaged data value to each of the pixels.

In another embodiment, the present disclosure provides a system for generating an image on a display. The display includes a plurality of pixels from a vector description of a scene. The system includes a circuit to sample data from the vector description to provide data samples at locations defined in relation to the pixels. The locations include a first location and second location at the edges of the pixels, a third location at the corner of the pixels and a fourth location at the center of the pixels. The system also includes a buffer to store the data samples. The system further includes a processor to process the data samples taken for each of the pixels to give an averaged data value for each of the pixels. The system still further includes a generator to generate the image on the display by applying the averaged data value to each of the pixels.

In still another embodiment, the present disclosure provides an image generator including a sampling circuit to sample data from a vector description to provide data samples at locations defined in relation to a plurality of pixels. The locations comprise a first location and second location at the edges of the pixels, a third location at the corner of the pixels and a fourth location at the center of the pixels. The image generator also includes a processor to process the data samples taken for each of the pixels to give an averaged data value for each of the pixels. The image generator still further includes a generator to generate the image on the display by applying the averaged data value to each of the pixels.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
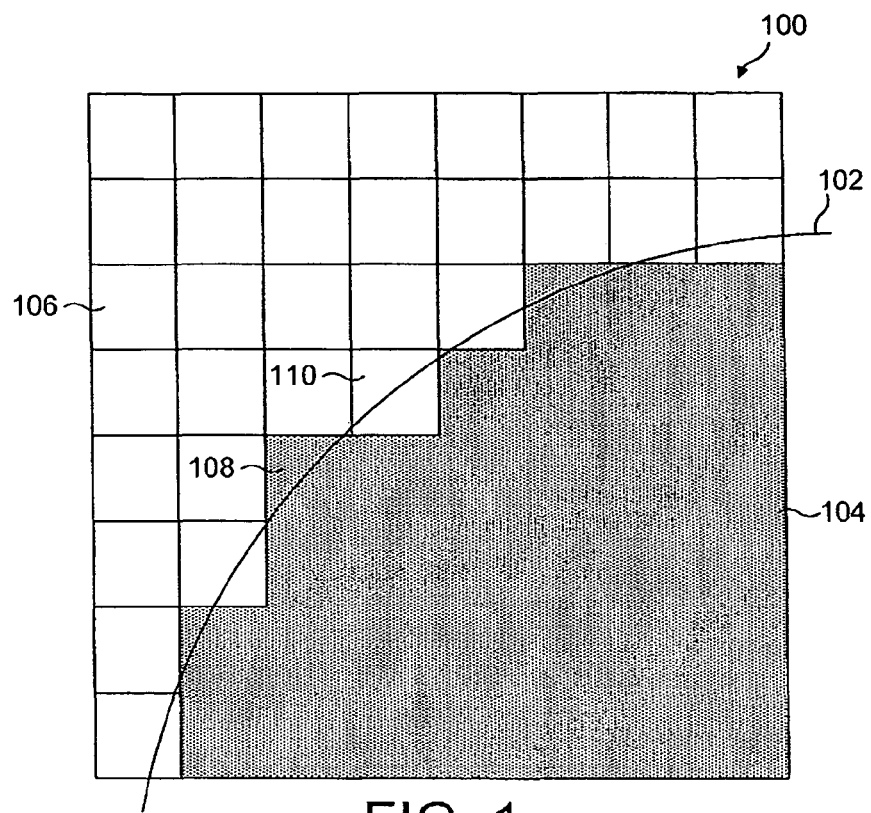
FIG. 1 depicts a conventional image rendered without anti-aliasing.
Figure 2:
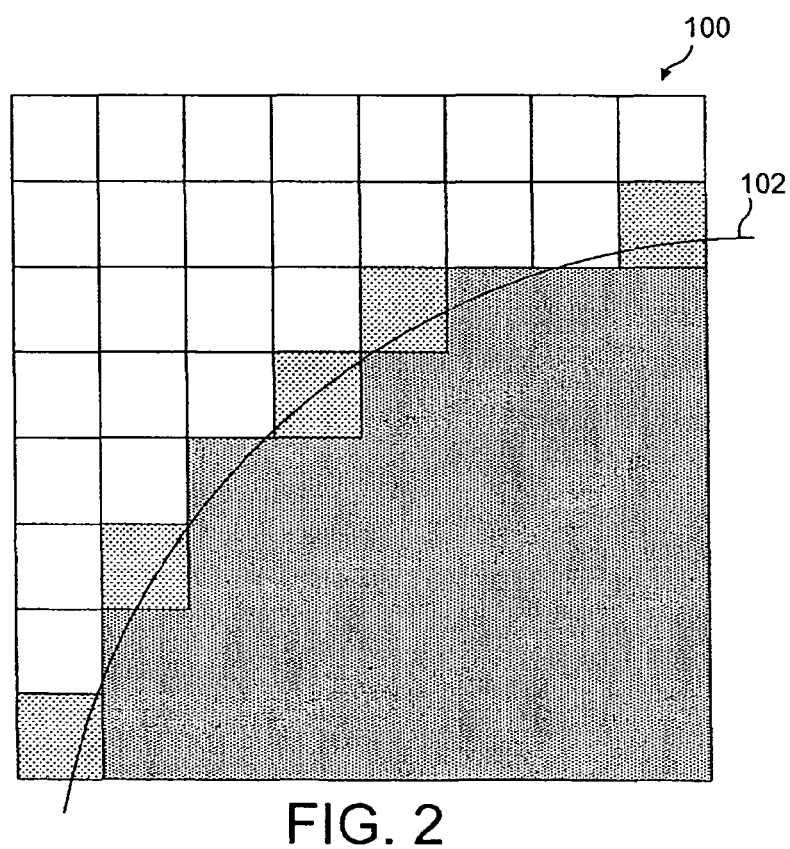
FIG. 2 depicts a conventional image rendered with anti-aliasing.
Figure 3:
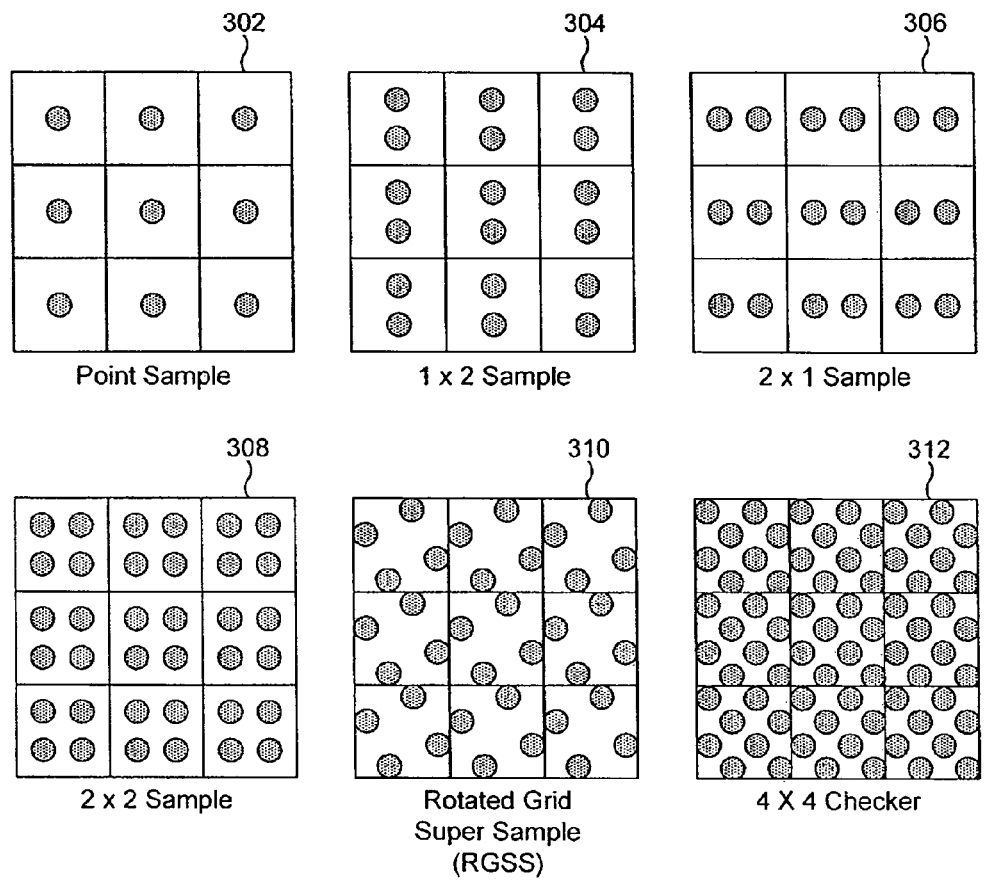
FIG. 3 depicts six conventional sample patterns used for full-screen anti-aliasing.
Figure 4:
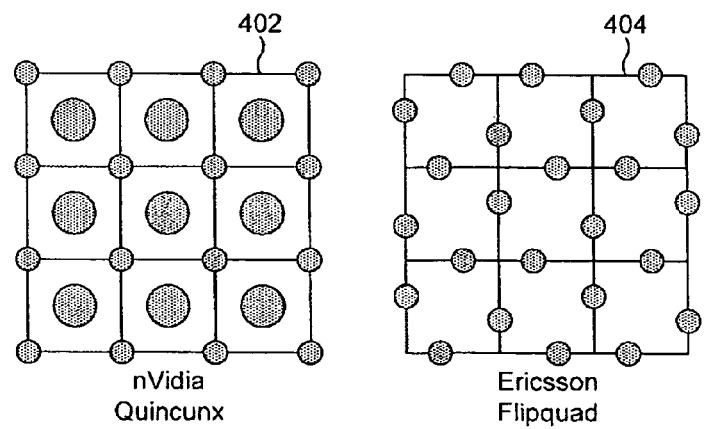
FIG. 4 depicts two conventional shared-sample patterns used for full-screen anti-aliasing.
Figure 5:
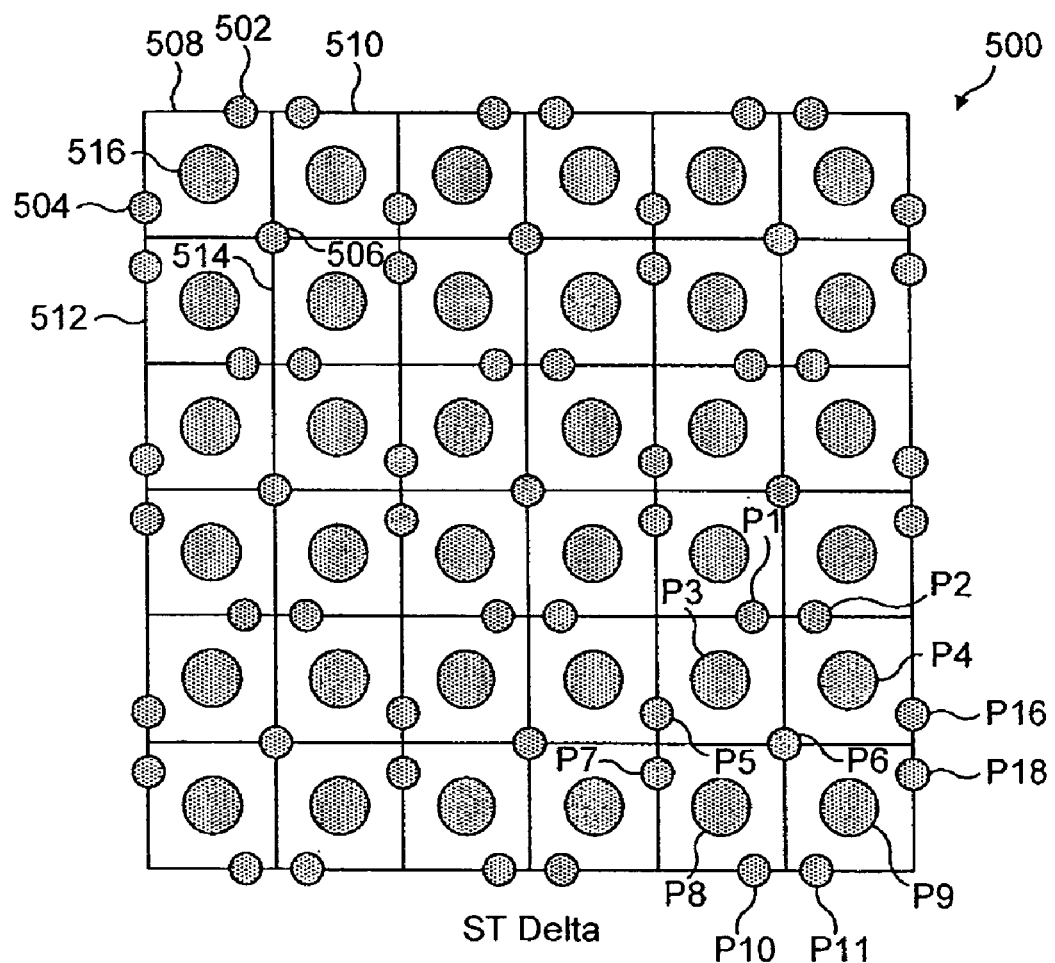
FIG. 5 is a delta sample pattern according to one embodiment of the present disclosure.

FIG. 5 depicts a shared sample pattern 500 which underlies an embodiment of the present disclosure. The sample pattern 500 is named ST Delta herein, because of the -like pattern of each pixel's samples. In one embodiment, each pixel of the sample pattern 500 comprises two edge samples (e.g., 502, 504) and a corner sample (e.g., 506), which are arranged in an alternating pattern such that the orientation of the samples is a mirror-image of the adjacent pixel, as shown by the alternating patterns of pixels 508, 510, 512 and 514. In one embodiment, the edge and corner samples are also combined with a central sample for each pixel. Due to the sample-sharing, the effective cost of each sample is 2¼ (1 for the center sample, ½ each for the edge samples and ¼ for the corner sample).

In one embodiment, the samples can be given different sample weightings. For example, the weighting pattern is 7/16 for the center sample and 3/16 for the other three samples, for an individual display pixel. Other weighting patterns can also be used according to one embodiment of the present disclosure.

Figure 6:
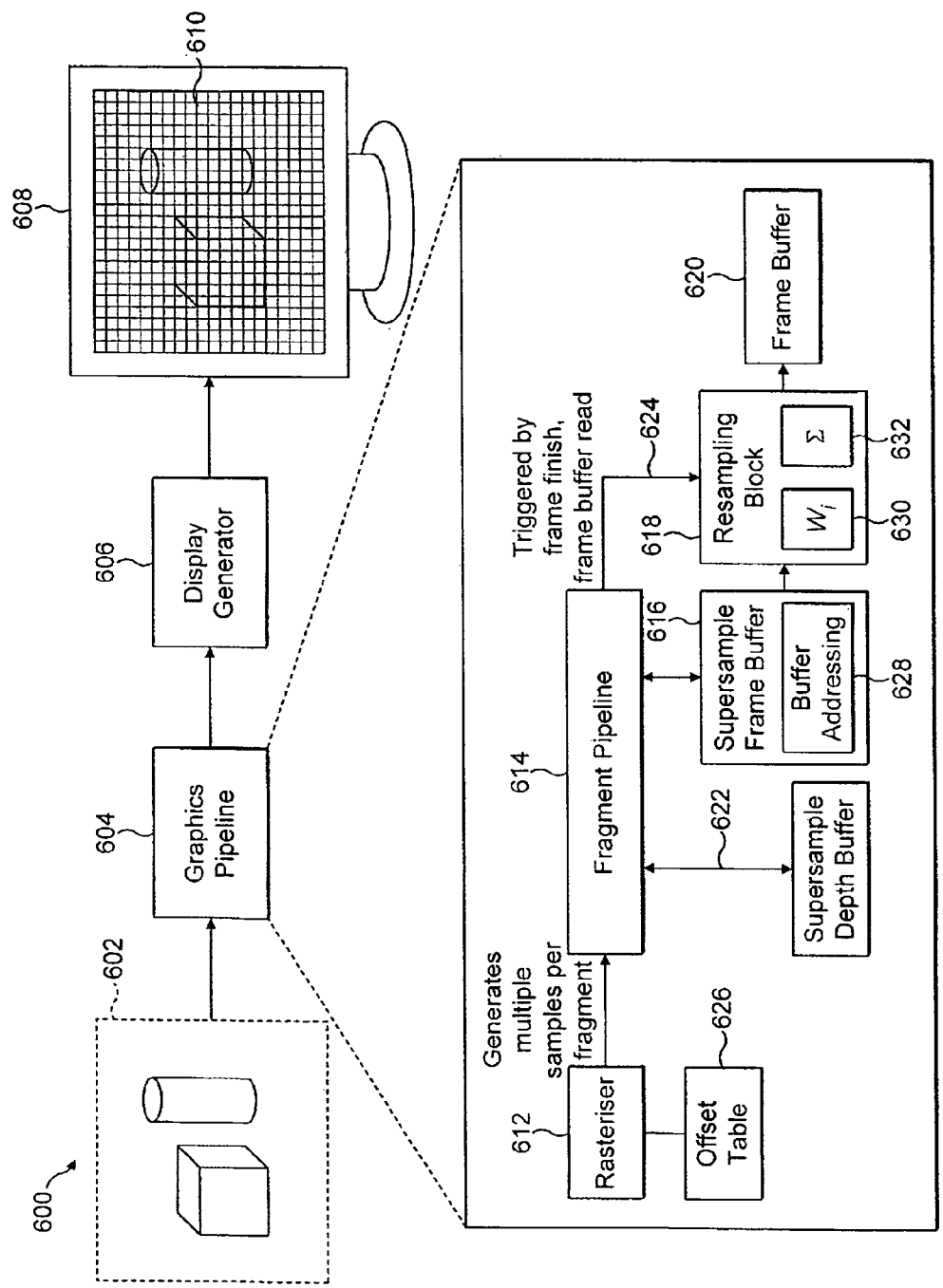
FIG. 6 is a graphics system using the sample pattern of FIG. 5 according to one embodiment of the present disclosure.

The sample pattern 500 shown in FIG. 5 is used to render an image in a graphics system 600 as shown in FIG. 6 according to one embodiment of the present disclosure. The graphics system 600 takes as input a vector description of a scene 602, which is provided to a graphics pipeline 604 that will be described in more detail hereinafter. In one embodiment, the graphics pipeline 604 performs (amongst other functions) the anti-aliasing according to the sample pattern 500 shown in FIG. 5. The output of the graphics pipeline 604 is an averaged data value for each of the pixels, and this is provided to a display generator 606, which converts the output of the graphics pipeline 604 into signals for driving a display 608 comprising a plurality of pixels 610. The result is that the pixels 610 of the display 608 show an anti-aliased representation of the scene 602 according to one embodiment of the present disclosure.

The graphics pipeline 604 is now considered in more detail. According to one embodiment of the present disclosure, the graphics pipeline 604 comprises a rasterizer 612, which operates according to the sample pattern 500 to generate the samples for each fragment. In one embodiment, samples of the scene 602 are taken according to the sample pattern 500 in the rasterizer 612 by implementing a rasterizing scan as shown in the rasterizer pattern 702 shown in FIG. 7. The rasterizer pattern 702 is shown illustrating the samples taken for four pixels, wherein the sample numbered P6 is located at the corner of the four pixels, samples P1, P2, P5, P7, P10, P11, P16 and P18 are the edge samples for the four pixels, and samples P3, P4, P8 and P9 are the center samples for the four pixels. The samples P1-P18 listed above are also shown marked on the sample pattern 500 shown in FIG. 5, in order to show how the rasterizer pattern 702 corresponds to the sample pattern 500. In one embodiment, the numbering of the samples shown in the rasterizer pattern 702 defines one possible order in which the rasterizer can take samples for each fragment. The order in which the samples are taken can affect how the samples are written to the frame buffers, as will be discussed later herein.

According to one embodiment of the present disclosure, the rasterizer 612 can determine the positions of the samples to be taken relative to the central sample for a fragment using an "offset table" 626. The offset table 626 stores the offsets from the central sample for a fragment to each of the samples in the rasterizer pattern 702. In one embodiment, the rasterizer can use these stored offsets to determine the location for each of the samples. Other techniques for determining the positions of the samples can also be implemented, such as on-the-fly calculation of the sample locations.

The samples generated by the rasterizer 612 are provided to the fragment pipeline 614, where they are processed and the relevant parts of the fragment data are placed in buffers. For example, depth information may be placed in a depth buffer. In the case of a super-sampling anti-aliasing technique, all fragment data is generated for all samples, and therefore there will be multiple samples per pixel for the depth information. This is shown in FIG. 6 as the super-sample depth buffer 622 according to one embodiment of the present disclosure.

The samples relating to the color of the fragment taken from the fragment pipeline 614 are stored in a super-sample frame buffer 616. The super-sample frame buffer 616 stores all of the samples produced by the rasterizer for a given frame. In one embodiment, samples are loaded into the buffer using an addressing scheme controlled by a buffer addressing block 628, which optimises use of the shared sample pattern of FIG. 5, so as to minimise the footprint of the super-sampled buffers. The way in which the samples are stored in the super-sample frame buffer 616 by the buffer addressing block 628 can be seen illustrated in FIG. 7. This shows how the rasterizer pattern 702, which defines the location of the samples and the order in which samples are taken by the rasterizer, determines the structure of the samples stored in the super-sample frame buffer, represented by the compact pattern 704 shown in FIG. 7 according to one embodiment of the present disclosure.

Figure 7:
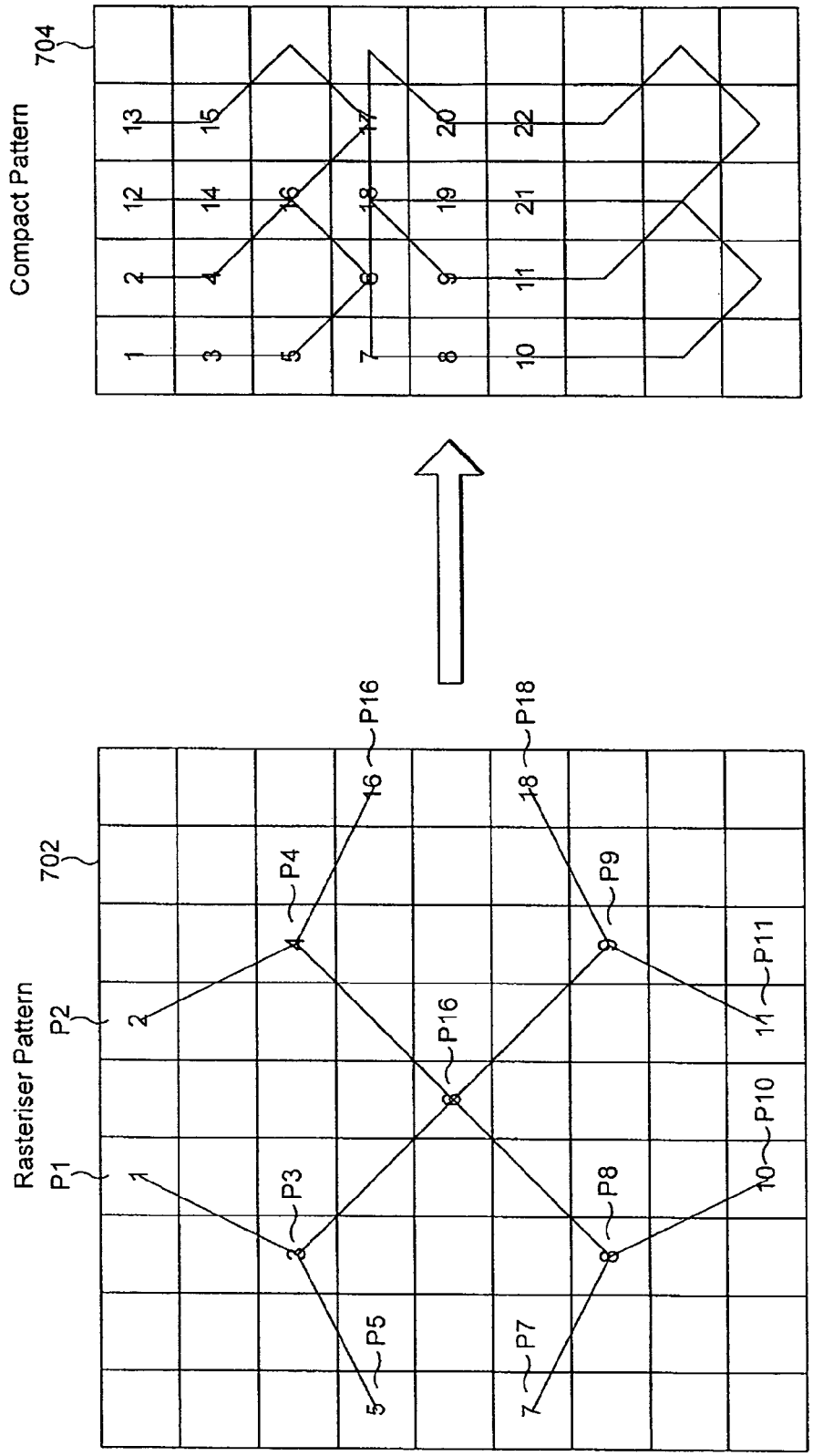
FIG. 7 shows a rasterizer pattern for the sample pattern of FIG. 5 according to one embodiment of the present disclosure.

The sample data is entered into the super-sample frame buffer 616 by the buffer addressing block 628 according to the specific patterns shown in FIG. 7. These patterns allow the samples to be stored in a compact manner, whilst permitting the samples (and in particular the shared samples) to be easily addressed and rapidly read out for each fragment. The compact pattern 704 shown in FIG. 7 compactly stores the samples whilst minimising distortion to the original sample pattern. This is because all samples (with one exception) on the same row of the original pattern remain on the same row of the compact pattern. For example, samples P1 and P2 are on the same row as each other in the sample pattern 702, and remain on the same row in the compact pattern 704. The exception to this is the corner sample P6, which is placed on the same row as P7 and P18 in order to increase the compactness of the pattern. Sample P6 could also equally be placed on the same row as P5 and P16 in an alternative embodiment. The storing of the samples in the super-sample frame buffer 616 according to the compact pattern 704 is implemented by the buffer addressing block 628 according to one embodiment of the present disclosure.

Returning again to FIG. 6, once all the samples for a frame have been produced by the rasterizer 612 and entered into the super-sample frame buffer 616, a trigger 624 is activated by the fragment pipeline 614 according to one embodiment of the present disclosure. This trigger is provided to a re-sampling block 618. In one embodiment, the re-sampling block 618 implements the Equation 1 shown previously, and processes the samples from the super-sample frame buffer 616 to combine them.

The samples for a fragment from the super-sample buffer 616 are read out to the re-sampling block 618 under the control of the buffer addressing block 628. The re-sampling block comprises a memory 630 for storing the values for the weighting factors to be applied to the samples. The weighting factors from the memory 630 are applied to the samples, and these are summed using an addition unit 632. The result of the re-sampling block 618 is the weighted average of the samples for a fragment, i.e., the weighted averaged color values for a pixel. The weighted averaged color values for the pixel is stored in a frame buffer 620. The calculation of the weighted averaged color value is repeated for each of the fragments in the super-sample buffer 616 until all samples have been averaged and written to the frame buffer 620 according to one embodiment of the present disclosure.

From the frame buffer the pixel data may be processed by further known parts of the graphics pipeline if required according to one embodiment of the present disclosure. Finally, in one embodiment, the data in the frame buffer 620 is converted by the display generator 606 to an analogue signal to be used to provide the final image for the computer display 608.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of generating an image on a display comprising a plurality of pixels from a vector description of a scene, the method comprising:
   sampling data from the vector description to provide the data samples at locations defined in relation to the pixels from the vector description, wherein the data samples are at locations defined in relation to the pixels from the vector description and are relative to a central sample as determined by a rasterizer, and wherein the locations comprise a first and a second location at the edges of the pixels, a third location at the corner of the pixels and a fourth location at the center of the pixels;
   storing the data samples in a buffer;
   processing the data samples taken for each of the pixels to give an averaged data value for each of the pixels; and
   generating the image on the display by applying the averaged data value to each of the pixels, wherein the storing comprises loading data samples into the buffer such that samples taken at locations having the same vertical coordinate in the vector description are located in the same row of the buffer.

2. The method according to claim 1, wherein the data samples include a value representing color.

3. The method according to claim 1 further comprising:
processing the data samples taken at the first location of a first pixel with samples from a second, third and fourth locations of the first pixel with a second, third and fourth locations of a second pixel to provide a first and second averaged data values.

4. The method according to claim 3 further comprising:
processing the data samples taken at the second location of the first pixel with samples from a first, third and fourth locations of the first pixel with a first, third and fourth locations of a third pixel to provide a first and third averaged data values.

5. A method according to claim 4 further comprising:
processing the data samples taken at the third location of the first pixel with samples from a first, second and fourth locations of the first pixel with a first, second and fourth locations of a fourth pixel, a first, second and fourth locations of a fifth pixel, and a first, second and fourth locations of a sixth pixel to provide a first, fourth, fifth and sixth averaged data values.

6. The method according to claim 1, wherein the locations are alternated between adjacent pixels in the display, such that the location of the first and second samples at the edge of a pixel is a mirror-image of an adjacent pixel.

7. The method according to claim 1, wherein the locations are alternated between adjacent pixels in the display, such that the location of the third sample at the corner of the pixel is a mirror-image of an adjacent pixel.

8. The method according to claim 1, wherein the step of processing further comprises:
applying a weighting factor to each data sample based on its location; and
summing the weighted samples.

9. The method according to claim 8, wherein the weighting factor for the first, second and third locations is 3/16, and the weighting factor for the fourth locations is 7/16.

10. The method according to claim 1, wherein the sampling further comprises rasterising according to a rasterising pattern.

11. The method according to claim 1, wherein the sample at the third location is loaded into the buffer in the same row as the samples vertically adjacent to the sample at the third location.

12. The method according to claim 1, wherein the vector description is stored as vertex data.

13. A system for generating an image on a display comprising a plurality of pixels from a vector description of a scene, the system comprising:
a circuit to sample data from the vector description to provide data samples are at locations defined in relation to the pixels, wherein the data samples are at locations defined in relation to the pixels from the vector description and are relative to a central sample as determined by a rasterizer, and,
wherein the locations comprise a first location and second location at the edges of the pixels, a third location at the corner of the pixels and a fourth location at the center of the pixels;
a buffer to store the data samples;
a processor to process the data samples taken for each of the pixels to give an averaged data value for each of the pixels; and
a generator to generate the image on the display by applying the averaged data value to each of the pixels wherein the storing comprises loading data samples into the buffer such that samples taken at locations having the same vertical coordinate in the vector description are located in the same row of the buffer.

14. The system according to claim 13, wherein the circuit comprises a rasterizer.

15. The system according to claim 13, wherein the data sample includes a value representing color.

16. The system according to claim 13, wherein the data samples taken by the circuit at the first location of a first pixel are processed by the processor with samples from second, third and fourth locations of the first pixel and with second, third and fourth locations of a second pixel to provide first and second averaged data values.

17. The system according to claim 16, wherein the data samples taken by the circuit at the second location of the first pixel are processed by the processor with samples from first, third and fourth locations of the first pixel and with first, third and fourth locations of a third pixel to provide first and third averaged data values.

18. The system according to claim 17, wherein the data samples taken by the circuit at the third location of the first pixel are processed by the processor with samples from first, second and fourth locations of the first pixel and with first, second and fourth locations of a fourth pixel, with first, second and fourth locations of a fifth pixel, and with first, second and fourth locations of a sixth pixel to provide first, fourth, fifth and sixth averaged data values.

19. The system according to claim 13, wherein the locations are alternated between adjacent pixels in the display, such that the location of the first and second samples at the edge of a pixel is a mirror-image of an adjacent pixel.

20. The system according to claim 13, wherein the locations are alternated between adjacent pixels in the display, such that the location of the third sample at the corner of the pixel is a mirror-image of an adjacent pixel.

21. The system according to claim 13, wherein the processor further comprises:
a storage circuit to store weighting factors to be applied to each data sample based on its location; and
a summing circuit to sum the weighted samples.

22. The system according to claim 21, wherein the weighting factor for the first, second and third locations is 3/16, and the weighting factor for the fourth location is 7/16.

23. The system according to claim 13, wherein the addresser loads the sample at the third location into the buffer in the same row as the samples vertically adjacent to the sample at the third location.

24. The system according to claim 13, wherein the vector description is stored as vertex data.

25. An image generator comprising:
a sampling circuit to sample data from a vector description to provide data samples at locations defined in relation to a plurality of pixels, wherein the data samples are at locations defined in relation to the plurality pixels from the vector description and are relative to a central sample as determined by a rasterizer, and,
wherein the locations comprise a first location and second location at the edges of the pixels, a third location at the corner of the pixels and a fourth location at the center of the pixels;
a processor to process the data samples taken for each of the pixels to give an averaged data value for each of the pixels; and a generator to generate the image on the display by applying the averaged data value to each of the pixels, wherein the sampling circuit loads data samples into a buffer such that samples taken at locations having the same vertical coordinate in the vector description are located in the same row of the buffer.

* * * * *